Feb. 19, 1929.  1,702,243
F. DE P. AXTELL
LID OR COVER
Filed March 12, 1928
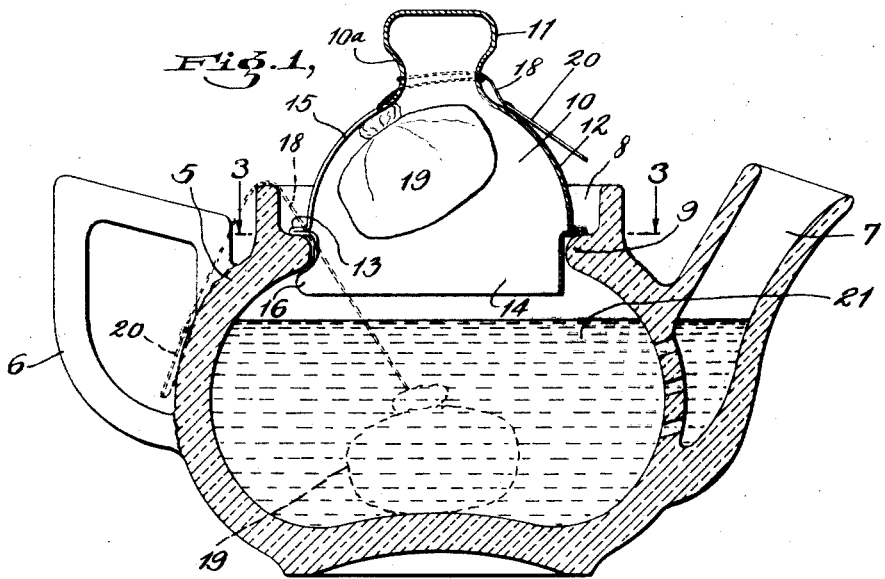
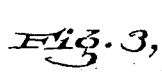
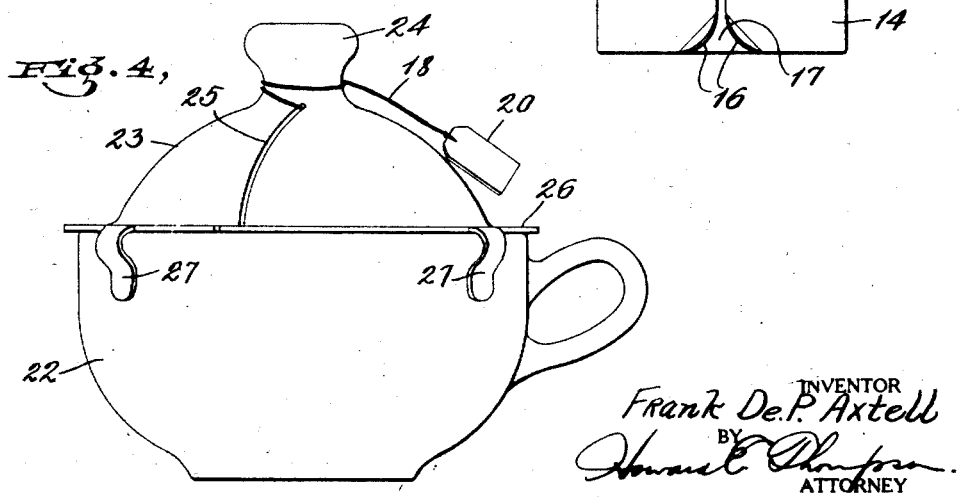
INVENTOR
Frank De P. Axtell
BY
ATTORNEY Patented Feb. 19, 1929.

1,702,243

UNITED STATES PATENT OFFICE.

FRANK DE P. AXTELL, OF NEW YORK, N. Y.

LID OR COVER.

Application filed March 12, 1928. Serial No. 260,897.

This invention relates to lids or covers of vessels of various kinds and classes, such for example as a tea pot, cup or the like; and the object of the invention is to provide a cover or closure member for vessels of this class with means for supporting a body normally submerged in the vessel or a fluid contained in the vessel and to permit of the raising of said body out of engagement with the fluid in the vessel, without removing the same from the vessel; a further object being to provide a cover of the class specified with a slotted or apertured wall through which a strand or cord is free to pass outwardly through the lower edge of the cover and upwardly adjacent the top or handle portion thereof; a further object being to provide means for retaining the cover against displacement from the vessel in connection with which the same is mounted; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view of a tea pot showing one of my improved covers mounted in connection therewith and indicating the method of its use.

Fig. 2 is a detail side view of the cover, detached,

Fig. 3 is a partial section on the line 3—3 of Fig. 1; and Fig. 4 is a side view of a cup, showing a modified form of cover mounted in connection therewith.

In Fig. 1 of the drawing, I have shown at 5 a tea pot to illustrate one method of carrying my invention into effect, the tea pot having a handle 6, a discharge spout 7 and an open end 8, having an annular flange 9 upon which my improved cover 10 rests. The cover 10 in the construction shown in Fig. 1 is fashioned from metal or similar hard and comparatively thin substance, but it will be understood that the cover may be made from material of any kind or class and of any suitable cross sectional form.
The cover 10 is shown in section in Fig. 1 and in side elevation in Fig. 2 and consists of a top knob or handle portion 11, and an annular downwardly extending or outwardly flared skirt portion 12 having adjacent its lower end, an enlarged flange portion 13, and a straight cylindrical end portion 14 which fits within the flange 9 of the tea pot as seen in Fig. 1. One side wall of the cover 10 is provided with a vertically extending slot or aperture 15 which terminates at its upper end adjacent the finger pieces 11 and opens outwardly through the straight part 14 of the skirt. The opposite side walls of the aperture 15 in the skirt part 14 are flared outwardly and rounded to form keepers or retaining members 16 as well as a conical throat 17, the latter facilitating the insertion of the strand or cord 18 or a tea bag 19 into the aperture 15, whereas the keepers 16 are adapted to pass beneath the flange 9 to retain the cover 10 against accidental displacement from the tea pot, especially in the operation of pouring tea therefrom.

The tea bag 19 together with the strand 18 and the tab or other enlargement 20 at the free end of said strand, is of conventional construction such as commonly used in restaurants in serving tea. In the use of my invention or in the operation of making a pot of tea, hot or boiling water is first placed in the tea pot as indicated at 21, Fig. 1 of the drawing, after which the strand 18 of a tea bag 19 is passed through the aperture 15 to position the bag within the cover 10, substantially in the position shown in Fig. 1 of the drawing. In this position, the cover is applied to the pot by first placing the side of the cover with the projecting members 16 thereon into the open end, and adjacent the handle 6, after which the cover may be set in position with the flange 13 resting upon the flange 9. Then, the hold on the strand 18 is released, allowing the tea bag 19 to drop into the water 21. After remaining in the water a predetermined length of time suitable for preparation of tea, say from three to six minutes, the strand 18 or the tab 20 thereon is grasped by the hand to raise the bag 19 into the position shown in Fig. 1 and is retained in such position within the cover 10 in any desired manner, such for example by winding the strand 18 around the neck portion 10ª of the cover, in the manner seen in Fig. 1.

The same result may be accomplished by mounting a cover made according to my invention on a vessel or container of any kind or class, and to illustrate another use or method of carrying my invention into effect, I have shown in Fig. 4 of the drawing, a tea cup 22 of conventional or any desired form. At 23, I have shown a cover having a top finger piece 24, an apertured wall 25 opening outwardly through the lower end of the cover as in the structure shown in Figs. 1 and 2. In this construction, the lower end portion of the cover is flanged as seen at 26, to rest upon the upper edge of the cup and said flange is also provided with external spring members or retainers 27 adapted to engage the outer wall of the cup to prevent the accidental displacement of the cover. With the construction shown in Fig. 4 of the drawing, a tea bag similar to that illustrated in Fig. 1 will be used in conjunction with the cup 22 and cover 23 in the same manner as with the tea pot 5 and cover 10, and will be supported in raised position by winding the strand 18 around the neck of the cover as will be apparent.

In making tea according to conventional methods, it is a common practice to leave a tea ball or bag submerged in a tea pot or cup, a sufficient period of time to create an excessive amount of what is known as tannic acid, a more or less poisonous substance which renders the tea bitter in taste. It is further a common practice to dilute what is termed "strong" tea with hot water, in the attempt to remedy improper preparaton, or weaken the tea, but this operation does not eliminate the tannic acid. This is largely due to more or less lack of proper understanding of the preparation of tea, and the further lack of means for effectively and efficiently caring for a tea ball or tea bag.

However, with my improved construction, and especially by marking upon the tab or sheet 20, a note stating that the bag 19 should be raised within a period of from two to six minutes of the time that the same is inserted into the water, tea may be prepared in a proper manner and without producing any, or at least, an excessive amount of the tannic acid. At the same time, a convenient storage for the tea bag is provided in a very neat, sanitary and practical manner.

With little education and experience, my improved method of making tea will be readily grasped by those preparing same, especially in patronizing restaurants where the use of tea bags is very extensive. As seen in Fig. 4 of the drawing, instead of preparing the tea in a pot, the tea may be directly prepared in the cup from which it is to be served, it being understood that the cover 23 is removed from the cup when the tea has been properly prepared. It will also be noted that no great amount of time is wasted in serving tea in restaurants or other places in accordance with my invention or in utilizing my improved cover construction, the latter being of a structure which can be readily cleaned, and thus maintained in a sanitary state at all times.

It will also be understood that my invention is not necessarily limited to what may be termed a cover member as any means by which the result herein described may be accomplished, may be employed. Further, my inventon is not limited to the specific use herein shown and described, as the same may be applied in apparatus of various kinds and classes in the treatment and preparation of fluids, compounds and the like, where it is desired to submerge a body in a liquid of any kind or class and to remove the same from the liquid without displacing the same from the container or the cover member thereof.

Various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. The combination with a liquid container of a cover mounted in connection with the open end of the container for closing the open end thereof, and means whereby a body adapted to be normally submerged in the liquid of the container may be supported above said liquid and in connection with said cover, said means involving an elongated aperture in one side wall of the cover and opening through the lower edge thereof.

2. The combination with a tea bag having an extending strand, of a cover member having an aperture in one wall opening through the lower end thereof, permitting of the passage of said strand into and through said aperture, and means whereby said bag may be supported within said cover.

3. A cover of the class described comprising a hollow body, one wall of which is provided with an elongated aperture opening through the lower end of the cover and inwardly and outwardly through the wall of the cover.

4. A cover of the class described comprising a hollow body, one wall of which is provided with an aperture opening through the lower end of the cover and inwardly and outwardly through the wall of the cover, said aperture terminating adjacent the upper end of the cover, a finger piece on said end, and the wall of the cover at the lower end thereof having outwardly extending keepers for retaining the cover against accidental displacement from its support.

5. The combination with a body having an extending strand provided at its free end with a finger piece, of a hollow, concavo-convex member, one wall of which is provided with an elongated aperture opening through the free edge of said member and extending to a point adjacent the upper end thereof in which the strand of said body is adapted to be placed by insertion through said open end for movably supporting said body in connection with said member.

6. The combination with a body having an extending strand provided at its free edge with a finger piece, of a hollow, concavo-convex member, one wall of which is provided with an elongated aperture opening through the free edge of said member and extending to a point adjacent the upper end thereof in which the strand of said body is adapted to be placed by insertion through said open end for movably supporting said body in connection with said member, and means on said member adapted to be engaged by said strand to support said body within said hollow member.

7. The combination with a conventional tea bag comprising a bag proper, a strand extending therefrom and a finger piece at the free end of said strand, of a concavo-convex body having a chamber within the walls thereof, the wall of said body having an elongated aperture opening outwardly through the free edge thereof and extending upwardly onto said body whereby said tea bag may be readily coupled and uncoupled with said body by the insertion of the strand into the aperture through the open end thereof in the use of the device.

8. The combination with a conventional tea bag comprising a bag proper, a strand extending therefrom and a finger piece at the free end of said strand, of a concavo-convex body having a chamber within the walls thereof, the wall of said body having an elongated aperture opening outwardly through the free edge thereof and extending upwardly onto said body whereby said tea bag may be readily coupled and uncoupled with said body by the insertion of the strand into the aperture through the open end thereof in the use of the device, and said body having means adapted to be engaged by the strand of the tea bag for supporting said bag in raised position and within the chamber of said body.

In testimony that I claim the foregoing as my invention I have signed my name this 5th day of March, 1928.

FRANK DE P. AXTELL.